US010018389B2

(12) United States Patent
Tanaka et al.

(10) Patent No.: US 10,018,389 B2
(45) Date of Patent: Jul. 10, 2018

(54) AIR-CONDITIONING APPARATUS

(75) Inventors: Kosuke Tanaka, Tokyo (JP); Koji Yamashita, Tokyo (JP); Takeshi Hatomura, Tokyo (JP); Shinichi Wakamoto, Tokyo (JP); Naofumi Takenaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 586 days.

(21) Appl. No.: 14/361,421

(22) PCT Filed: Dec. 22, 2011

(86) PCT No.: PCT/JP2011/007199
§ 371 (c)(1),
(2), (4) Date: May 29, 2014

(87) PCT Pub. No.: WO2013/093979
PCT Pub. Date: Jun. 27, 2013

(65) Prior Publication Data
US 2014/0331702 A1    Nov. 13, 2014

(51) Int. Cl.
*F25B 13/00* (2006.01)
*F25B 49/02* (2006.01)
(Continued)

(52) U.S. Cl.
CPC .............. *F25B 49/02* (2013.01); *F25B 13/00* (2013.01); *F25B 29/003* (2013.01);
(Continued)

(58) Field of Classification Search
CPC ...... F25B 1/00; F25B 3/00; F25B 2400/0409; F25B 2600/2501; F25B 2600/0271;
(Continued)

(56) References Cited

U.S. PATENT DOCUMENTS 4,771,610 A * 9/1988 Nakashima ............... F25B 5/00
62/160
5,524,446 A * 6/1996 Hotta .................. B60H 1/00392
165/43
(Continued)

FOREIGN PATENT DOCUMENTS

EP          2312226 A2    4/2011
JP        10-026430 A     1/1998
(Continued)

OTHER PUBLICATIONS

International Search Report of the International Searching Authority dated Mar. 13, 2012 for the corresponding international application No. PCT/JP2011/007199 (and English translation).
(Continued)

*Primary Examiner* — Len Tran
*Assistant Examiner* — Kamran Tavakoldavani
(74) *Attorney, Agent, or Firm* — Posz Law Group, PLC

(57) ABSTRACT

An air-conditioning apparatus including a refrigeration cycle configured by connecting one or more load-side units including a load-side heat exchanger and a load-side expansion device with a heat-source-side unit including a heat-source-side heat exchanger and a compressor and by causing refrigerant to circulate through a refrigerant circuit including the load-side heat exchanger, the load-side expansion device, the heat-source-side heat exchanger, and the compressor, controls, during a heating operation, the opening degree of the load-side expansion device, based on the discharge pressure of the compressor, so that the pressure of refrigerant at the outlet of the compressor becomes equal to a target pressure, in the case where the operation capacity of the compressor is approximately at the maximum value of the operation capacity of the compressor.

8 Claims, 7 Drawing Sheets

(51) Int. Cl.
  *F25B 29/00* (2006.01)
  *F25B 41/04* (2006.01)
  *F25B 1/10* (2006.01)

(52) U.S. Cl.
  CPC .......... *F25B 41/043* (2013.01); *F25B 49/027* (2013.01); *F25B 1/10* (2013.01); *F25B 2313/02741* (2013.01); *F25B 2313/0312* (2013.01); *F25B 2500/19* (2013.01); *F25B 2600/021* (2013.01); *F25B 2600/0271* (2013.01); *F25B 2600/2513* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21163* (2013.01); *Y02B 30/741* (2013.01)

(58) Field of Classification Search
  CPC ............ F25B 2313/005; F25B 2600/25; F25B 2600/2513; F25B 2700/151; F25B 2700/2116
  See application file for complete search history.

(56) References Cited

U.S. PATENT DOCUMENTS

| | | | | |
|---|---|---|---|---|
| 6,023,935 | A * | 2/2000 | Okazaki | F25B 25/00 62/119 |
| 2002/0073721 | A1* | 6/2002 | Seo | F25B 49/022 62/228.3 |
| 2004/0134206 | A1* | 7/2004 | Lee | F25B 13/00 62/157 |
| 2005/0284164 | A1* | 12/2005 | Ohta | F25B 49/02 62/228.3 |
| 2006/0005552 | A1* | 1/2006 | Anyoji | B60H 1/00764 62/133 |
| 2006/0080989 | A1* | 4/2006 | Aoki | F25B 13/00 62/324.4 |
| 2007/0204641 | A1* | 9/2007 | Harrison | B60H 1/00764 62/241 |
| 2007/0209779 | A1* | 9/2007 | Shinmura | B60H 1/00878 165/42 |
| 2010/0223940 | A1* | 9/2010 | Kotani | F25B 45/00 62/149 |
| 2011/0041524 | A1* | 2/2011 | Lifson | F25B 6/04 62/79 |

FOREIGN PATENT DOCUMENTS

| | | |
|---|---|---|
| JP | 2003-042574 A | 2/2003 |
| JP | 2009-270822 A | 11/2009 |
| JP | 2010-091209 A | 4/2010 |
| JP | 2011-007482 A | 1/2011 |

OTHER PUBLICATIONS

Extended European Search Report dated Mar. 4, 2016 in the corresponding EP application No. 11877666.5.

* cited by examiner

CONTROL OPERATION DURING HEATING OPERATION

CONTROL OPERATION DURING HEATING OPERATION

CONTROL OPERATION DURING HEATING OPERATION

AIR-CONDITIONING APPARATUS

CROSS REFERENCE TO RELATED APPLICATION

This application is a U.S. national stage application of International Application No. PCT/JP2011/007199 filed on Dec. 22, 2011, the disclosure of which is incorporated by reference.

TECHNICAL FIELD

The present invention relates to a separation-type air-conditioning apparatus, which includes an indoor unit and an outdoor unit connected by a connection pipe, and more particularly, to control for increasing the heating capacity.

BACKGROUND ART

Conventional air-conditioning apparatuses configured by connecting a compressor, a four-way valve, an outdoor heat exchanger, an expansion valve, and an indoor heat exchanger with each other, perform control for suppressing a reduction in the heating capacity by increasing a control target value of the degree of subcooling of refrigerant at the outlet of the indoor heat exchanger and thus raising high-pressure side pressure, when there is a shortage of the heating capacity in a state in which the compressor is operating at a high capacity (see, for example, Patent Literature 1).

Air-conditioning apparatuses exist which inject refrigerant into a compressor to achieve a sufficient heating capacity in a cold region where the outside air temperature is around minus 10 degrees Centigrade. Usually, since the flow rate of refrigerant sucked in a compressor decreases with a drop in the outside air temperature, the heating capacity decreases. In response to this, refrigerant is supplied from an injection port of the compressor to increase the density of refrigerant in a compression chamber and to increase the circulation amount of refrigerant, thereby increasing the heating capacity (see, for example, Patent Literature 2).

CITATION LIST

Patent Literature

Patent Literature 1: Japanese Unexamined Patent Application Publication No. 2011-007482 (Page 14, FIG. 1)
Patent Literature 2: Japanese Unexamined Patent Application Publication No. 10-26430 (Page 7, FIG. 1)

SUMMARY OF INVENTION

Technical Problem

Conventional air-conditioning apparatuses, however, have the problems described below. First, in the refrigerant circuit described in Patent Literature 1, during a heating operation, the degree of subcooling needs to be calculated. For example, in the case where leakage of refrigerant due to aged deterioration has occurred or refrigerant is charged deficiently at the initial installment, it is impossible to secure the degree of subcooling, and therefore the degree of subcooling cannot be calculated, which results in an excessive throttling. Thus, there is a problem that a desired control of the air-conditioning apparatus cannot be performed.

In the refrigerant circuit described in Patent Literature 2, injection increases the circulation amount of refrigerant, and therefore the heating capacity is increased. However, a large amount of injection brings about a liquid compression operation in a compression process, which disables an injection of more than a predetermined amount in order to ensure the reliability of the compressor. Thus, there is a problem that a smaller improvement in the heating capacity is achieved.

The present invention has been made in consideration of the above points, and it is an object of the present invention to provide an air-conditioning apparatus that is capable of exhibiting the maximum heating capacity as a system by controlling high-pressure side pressure of a load-side heat exchanger and the degree of suction superheat of a compressor through adjustment of a reduction in the flow rate of refrigerant.

Solution to Problem

In order to achieve the above object, the present invention provides the solutions described below.

An air-conditioning apparatus according to the present invention forms a refrigeration cycle by connecting one or more load-side units including a load-side heat exchanger and a load-side expansion device with a heat-source-side unit including a heat-source-side heat exchanger and a compressor and by causing refrigerant to circulate through a refrigerant circuit including the load-side heat exchanger, the load-side expansion device, the heat-source-side heat exchanger, and the compressor. During a heating operation, in a case where an operation capacity of the compressor is approximately at a maximum value of the operation capacity of the compressor, the air-conditioning apparatus controls an opening degree of the load-side expansion device, based on a discharge pressure of the compressor, so that pressure of refrigerant at an outlet of the compressor becomes equal to a target pressure.

Advantageous Effects of Invention

According to the present invention, an air-conditioning apparatus that is capable of constantly exhibiting the maximum heating capacity as a system by controlling high-pressure side pressure of a load-side heat exchanger and the degree of suction refrigerant superheat of a compressor through adjustment of a reduction in the flow rate of refrigerant, can be obtained.

DESCRIPTION OF EMBODIMENTS

Embodiments of the present invention will be described in details hereinafter with reference to the figures.

Embodiment 1

Figure 1:
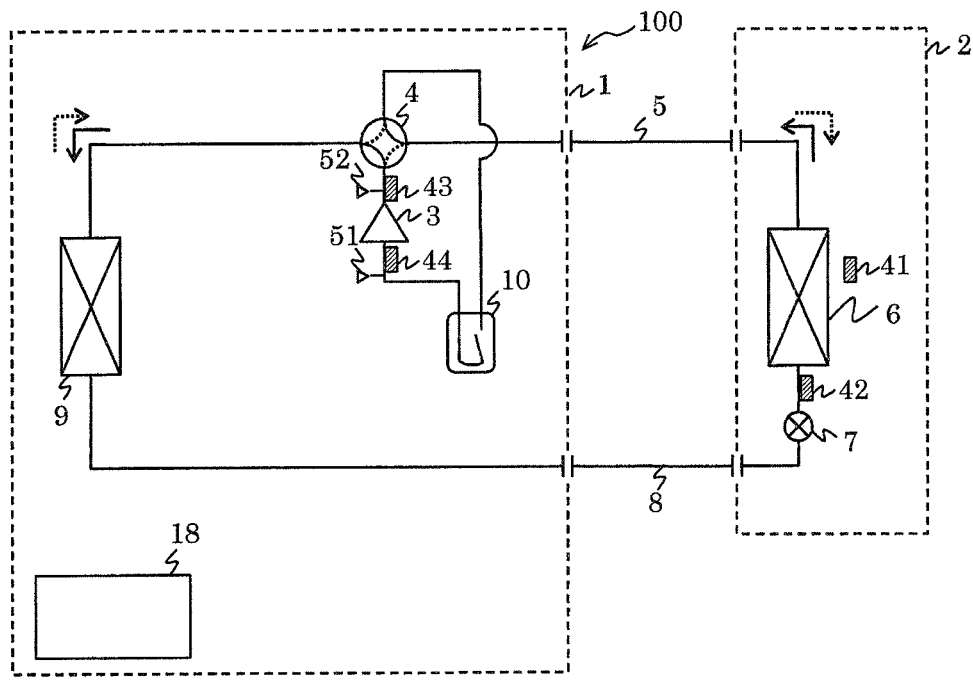
FIG. 1 is a system diagram of an air-conditioning apparatus according to Embodiment 1 of the present invention.

FIG. 1 is a refrigerant circuit diagram of an air-conditioning apparatus 100 according to Embodiment 1 of the present invention. In FIG. 1, an outdoor unit (heat-source-side unit) 1 includes a compressor 3, a four-way valve 4 which switches between a heating operation and a cooling operation, an outdoor heat exchanger (heat-source-side heat exchanger) 9, and an accumulator 10. An indoor unit (load-side unit) 2 includes an indoor heat exchanger (load-side heat exchanger) 6 and a load-side expansion device 7.

The compressor 3 is of a type in which capacity control is performed by controlling the rotation speed with an inverter.

The load-side expansion device 7 is an electronic expansion valve of which opening degree is variably controlled. Further, the outdoor heat exchanger 9 exchanges heat with outside air blown by a fan or the like. A gas pipe 5 and a liquid pipe 8 are connection pipes which allow connection between the outdoor unit 1 and the indoor unit 2.

Refrigerant which may be used for the refrigeration cycle of the air-conditioning apparatus 100 includes a non-azeotropic refrigerant mixture, a near-azeotropic refrigerant mixture, a single refrigerant, and the like. A non-azeotropic refrigerant mixture may be R407C (R32/R125/R134a), which is an HFC (hydrofluorocarbon) refrigerant, or the like. A non-azeotropic refrigerant mixture is a mixture of refrigerants having different boiling points, and thus has a characteristic that the composition ratio differs between a liquid-phase refrigerant and a gas-phase refrigerant. A near-azeotropic refrigerant mixture may be R410A (R32/R125) or R404A (R125/R143a/R134a), which is an HFC refrigerant, or the like. A near-azeotropic refrigerant mixture has a characteristic of having a working pressure about 1.6 times of R22, in addition to the same characteristics as those of non-azeotropic refrigerant mixtures.

A single refrigerant may be R22, which is an HCFC (hydrochloro-fluorocarbon) refrigerant, R134a, which is an HFC refrigerant, R1234yf or R1234ze, which is an HFO refrigerant, or the like. A single refrigerant is not a mixture, and thus has a characteristic of being easy to use. In addition, a natural refrigerant, such as carbon dioxide, propane, isobutene, or ammonia, may be used. R22 represents chlorodifluoromethane, R32 represents difluoromethane, R125 represents pentafluoroethane, R134a represents 1,1,1,2-tetrafluoroethane, and R143a represents 1,1,1-trifluoroethane. Thus, it is desirable to use a refrigerant according to the application or purpose of the air-conditioning apparatus 100.

Inside the outdoor unit 1, a measurement control device 18 and individual temperature sensors are installed. A temperature sensor 43 measures refrigerant temperature at the discharge side of the compressor 3 where the temperature sensor 43 is installed, and a temperature sensor 44 measures refrigerant temperature at the suction side of the compressor 3 where the temperature sensor 44 is installed.

Inside the indoor unit 2, temperature sensors 41 and 42 are installed. The temperature sensor 42 is installed at a portion between the indoor heat exchanger 6 and the load-side expansion device 7 and measures refrigerant temperatures at the position where the temperature sensor 42 is installed. The temperature sensor 41 measures the temperature of air sucked in the indoor heat exchanger 6. When a heat medium serving as a load is a different medium, such as water, the temperature sensor 41 measures the inflow temperature of the medium.

Inside the outdoor unit 1, pressure sensors 51 and 52 are installed. The pressure sensor 51 measures the pressure of sucked refrigerant of the compressor 3, and the pressure sensor 52 measures the pressure of discharged refrigerant of the compressor 3. The measurement control device 18 provided inside the outdoor unit 1 controls an operation method of the compressor 3, flow switching of the four-way valve 4, the amount of air blown by the outdoor heat exchanger 9, the opening degree of individual expansion devices, and the like, based on measurement information of a temperature sensor and a pressure sensor and based on operation contents instructed by a user of the air-conditioning apparatus.

Next, a heating operation of the air-conditioning apparatus 100 will be described with reference to FIG. 1 and a p-h diagram illustrated in FIG. 2. At the time of a heating operation, the flow passage of the four-way valve 4 is set in the direction of the broken line in FIG. 1. A high-temperature and high-pressure gas refrigerant discharged from the compressor 3 (point (a) on the broken line in FIG. 2) passes through the four-way valve 4, flows out from the outdoor unit 1, passes through the gas pipe 5, and flows into the indoor unit 2. Then, the refrigerant flows into the indoor heat exchanger 6, condenses and liquefies while transferring heat at the indoor heat exchanger 6 serving as a condenser, and turns into a high-pressure liquid refrigerant (point (b) on the broken line in FIG. 2). Heating is performed by providing heat transferred from refrigerant to a load-side medium, such as air or water, on a load side.

Figure 2:
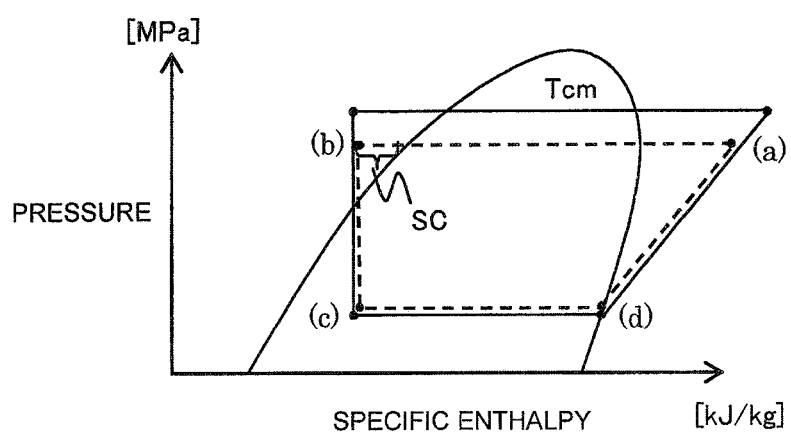
FIG. 2 is a p-h diagram of the air-conditioning apparatus according to Embodiment 1 of the present invention.

The high-pressure refrigerant which has flowed out of the indoor heat exchanger 6 is decompressed at the load-side expansion device 7 (point (c) on the broken line in FIG. 2), passes through the liquid pipe 8, flows into the outdoor unit 1, flows into the outdoor heat exchanger 9 serving as an evaporator, receives heat there, and evaporates and gasifies (point (d) on the broken line in FIG. 2). Then, the refrigerant passes through the four-way valve 4 and the accumulator 10, and is sucked in the compressor 3.

Next, a control operation of the air-conditioning apparatus 100 will be described. The air-conditioning apparatus 100 controls the opening degree of the load-side expansion device 7 so that the degree of subcooling SC of refrigerant at the outlet of the indoor heat exchanger 6 becomes equal to a target degree of subcooling SCm. Here, the degree of subcooling SC of refrigerant at the outlet of the indoor heat exchanger 6 is calculated from a discharge pressure Pd detected by the pressure sensor 52 and a refrigerant temperature To at the outlet of the indoor heat exchanger 6 detected by the temperature sensor 42. More specifically, first, the discharge pressure Pd detected by the pressure sensor 52 is converted into a saturation temperature of refrigerant to obtain a condensing temperature Tc. Then, by subtracting the condensing temperature Tc from the refrigerant temperature To at the outlet of the indoor heat exchanger 6 detected by the temperature sensor 42, the degree of subcooling SC is obtained.

Since the heating capacity required for the air-conditioning apparatus varies according to an indoor-side heat load and the like, it is necessary for the air-conditioning apparatus 100 to be capable of responding to a change in the heating capacity required at the time of a heating operation. Therefore, the air-conditioning apparatus 100 performs control for changing the operation capacity of the compressor 3 so that the condensing temperature Tc, which corresponds to the high-pressure side pressure Pd of the refrigerant circuit, becomes closer to the target condensing temperature Tcm, which corresponds to a target high-pressure side pressure. The operation capacity control of the compressor 3 is control utilizing a feature that in the case where a heating operation is being performed with the condensing temperature Tc being close to the target condensing temperature Tcm, the air-conditioning apparatus 100 can be regarded as roughly satisfying a required heating capacity. Here, the control of the operation capacity of the compressor 3 is performed by changing an operation frequency f of the compressor 3. The operation capacity of the compressor 3 is calculated from the operation frequency f or the like.

However, during a heating operation of the air-conditioning apparatus 100, when the degree-of-subcooling control is performed by the load-side expansion device 7 with the target degree of subcooling SCm being preset to a certain value, there is a possibility for the following problem to occur even if the operation capacity control of the compressor 3 is performed. That is, in the case where the condensing temperature Tc has not increased to the target condensing temperature Tcm even when the operation capacity of the compressor 3 has reached the maximum value through the operation capacity control of the compressor 3, the heating capacity is in not sufficient relative to the required heating capacity. In such a case, there is a risk to cause a problem of not being able to increase the heating capacity to the required heating capacity.

Thus, in some cases, a required heating capacity may not be obtained merely by performing the operation capacity control of the compressor 3 while performing the degree-of-subcooling control by the load-side expansion device 7 with the target degree of subcooling SCm being preset to a certain value, in which case the heating capacity control can be performed only within the variable range of the operation capacity of the compressor 3.

In order to solve such a problem, in the case where the condensing temperature Tc has not reached the target condensing temperature Tcm when the compressor 3 is performing an operation with the maximum operation capacity during the degree-of-subcooling control by the load-side expansion device 7, the air-conditioning apparatus 100 reduces the opening degree of the load-side expansion device 7 to increase the heating capacity, and performs control for increasing the condensing temperature Tc, based on the value of the pressure sensor 52.

In FIG. 2, the solid line on the p-h diagram represents how the saturation temperature Tc converted from a high-pressure side pressure by the pressure sensor 52 becomes equal to the target condensing temperature Tcm by expansion at the load-side expansion device 7. Assuming that the normal state is illustrated as the cycle by the broken line, the diagram indicates an increased high-pressure side pressure and an increased discharge temperature cause the heating capacity to increase.

Figure 3:
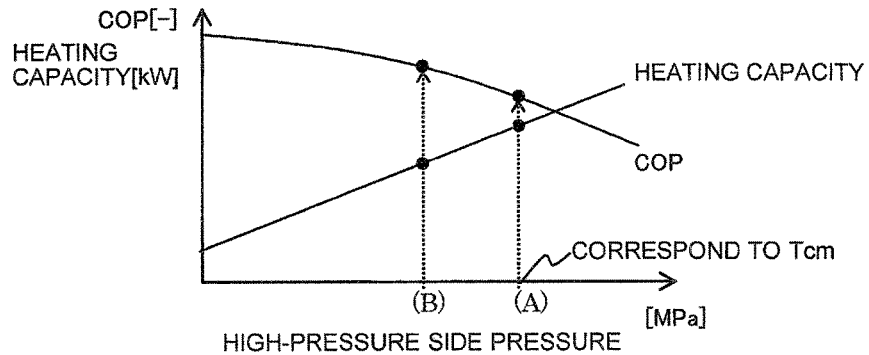
FIG. 3 is a diagram illustrating the relation between COP and heating capacity with respect to high-pressure side pressure in Embodiment 1 of the present invention.

FIG. 3 illustrates the relation between the COP and heating capacity of the air-conditioning apparatus 100 with respect to high-pressure side pressure. At the time of a heating operation, the load-side expansion device 7 performs control so that the degree of subcooling at the outlet of the indoor heat exchanger 6 is made constant, and the compressor 3 controls the operation capacity so that the high-pressure side pressure becomes equal to a saturation pressure corresponding to the target condensing temperature Tcm, and maintains the pressure of (A) in FIG. 3. When the outside air temperature drops, due to a reduced evaporating pressure caused by the drop in the outside air temperature, the density of refrigerant sucked in the compressor 3 decreases. Therefore, the circulation amount of refrigerant decreases accordingly. This makes it impossible to increase the circulation amount of refrigerant when the air-conditioning apparatus is operating at the maximum operation capacity, and causes the heating capacity to decrease. High pressure in FIG. 3 decreases from (A) to (B), and the heating capacity decreases.

Therefore, the control target of the load-side expansion device 7 is shifted from the degree of subcooling at the outlet of the indoor heat exchanger 6 to the target condensing temperature Tcm of high-pressure side pressure. By reducing the current opening degree of the load-side expansion device 7 of (B) in FIG. 3, high-pressure side pressure is increased and can be controlled to a pressure corresponding to the desired target condensing temperature Tcm ((A) in FIG. 3), thus achieving a desired heating capacity. At this time, high-pressure side pressure increases, and the COP decreases accordingly. However, since the heating capacity corresponding to an air-conditioning load is maintained, indoor comfort is enhanced. Thus, by controlling high-pressure side pressure to be the desired pressure with the load-side expansion device 7 when the compressor 3 is operating at the maximum operation capacity, the air-conditioning apparatus 100 becomes capable of exhibiting the maximum heating capacity.

Owing to the control target of the load-side expansion device 7 being high-pressure side pressure, the air-conditioning apparatus 100 can be controlled to operate at the minimum level, even in the case where there is a slight shortage in the amount of charged refrigerant in the air-conditioning apparatus 100 (for example, in the case where there is a leakage of refrigerant due to aged deterioration caused by pipe junction defect or refrigerant is charged deficiently relative to a specified refrigerant amount at the initial installment) and the degree of subcooling at the outlet of the indoor heat exchanger 6 cannot be ensured.

Next, control of the compressor 3 and the load-side expansion device 7 at the time of a heating operation of the air-conditioning apparatus 100 will be described with reference to the flowchart in FIG. 4. First, at the start of the air-conditioning apparatus 100, an initial capacity of the compressor 3 and an initial opening degree of the load-side expansion device 7 are set (S1). Next, after waiting until a predetermined time passes (S2), it is determined whether the indoor air temperature detected by the temperature sensor 41 is equal to a value preset by a user (S3). When the indoor air temperature is lower than the preset value, the operation capacity of the compressor 3 is increased, and when the indoor air temperature is higher than the preset value, the operation capacity of the compressor 3 is reduced (S4). Then, it is determined whether the current status of the operation capacity of the compressor is at the maximum capacity (S5). When the compressor 3 is operating at the maximum operation capacity, it is determined whether the discharge pressure of the pressure sensor 52 has reached a pressure corresponding to a target condensing temperature (S6). When the discharge pressure has not reached the pressure corresponding to the target condensing temperature, since there is a shortage of the heating capacity, the opening degree of the load-side expansion device 7 is changed so that the discharge pressure becomes equal to the pressure corresponding to the target condensing temperature (S7). When the compressor is operating at a discharge pressure equal to or higher than the desired target value, since a desired heating capacity is achieved, the opening degree of the load-side expansion device 7 is changed so that the degree of subcooling at the outlet of the indoor heat exchanger 6 becomes equal to a preset value (S8).

The above control makes it easier, for the air-conditioning apparatus 100, to increase, even in the case where the heating capacity cannot be increased to a required heating capacity (that is, target condensing temperature Tcm) merely by performing the operation capacity control of the compressor 3, the heating capacity to the required heating capacity, and the controllable range towards a larger heating capacity may thus be expanded.

Figure 4:
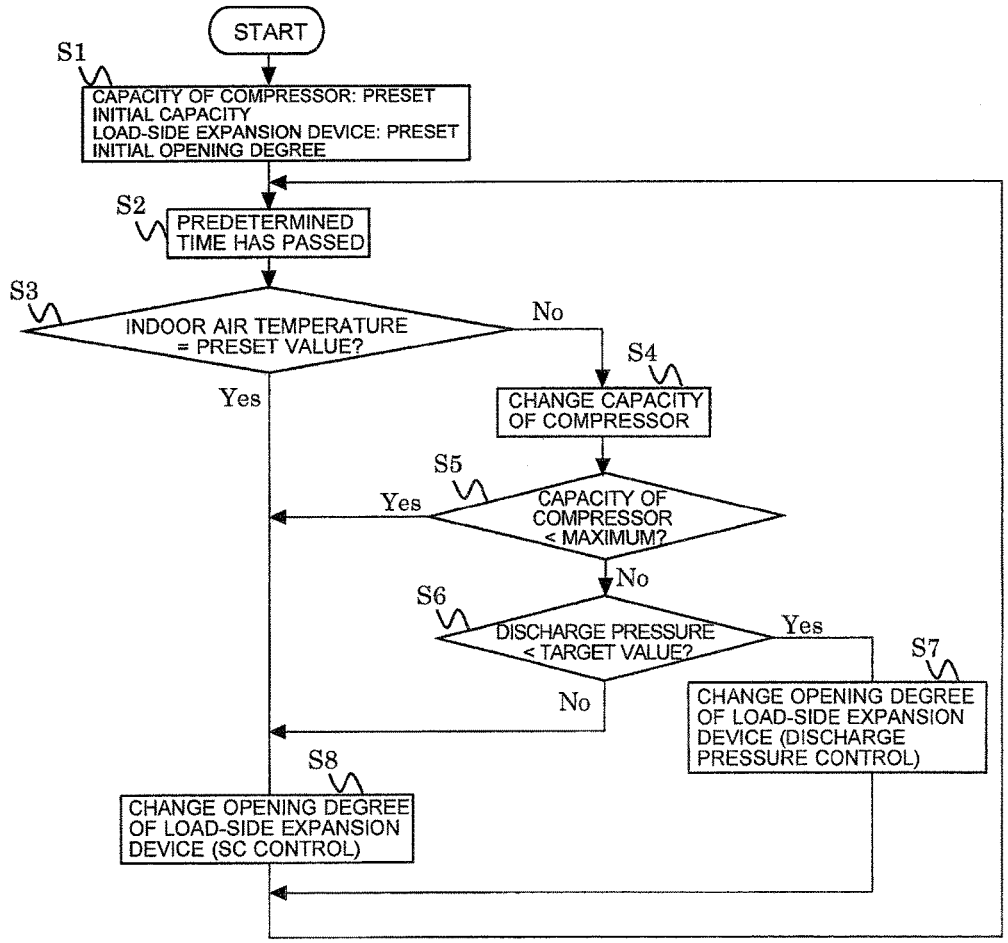
FIG. 4 is a control flowchart at the time of a heating operation of the air-conditioning apparatus according to Embodiment 1 of the present invention.
Figure 5:
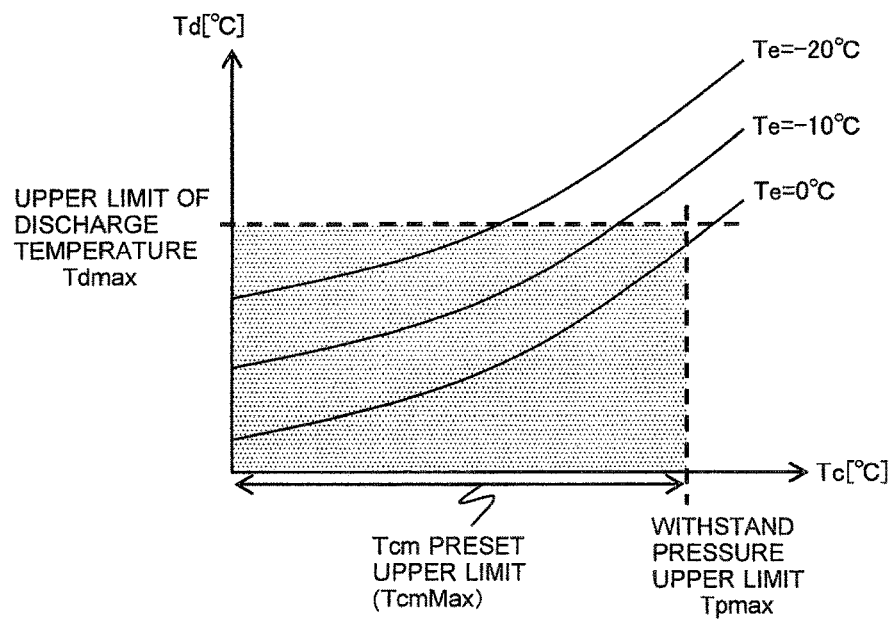
FIG. 5 is a diagram illustrating the relation between condensing temperature and discharge temperature of the air-conditioning apparatus according to Embodiment 1 of the present invention.

The target condensing temperature Tcm of the discharge pressure illustrated in FIG. 4 may be made variable. FIG. 5 illustrates, in the air-conditioning apparatus 100, the relation of a discharge temperature Td relative to the condensing temperature Tc for each of evaporating temperatures Te, which are saturation temperatures converted by the pressure sensor 51 which is positioned at the suction side of the compressor 3. An upper limit Tdmax (for example, 120 degrees Centigrade) of the discharge temperature for the compressor is provided, in order to prevent seizure of refrigerating machine oil or demagnetization of a compressor motor magnet. In addition, there is an upper-limit withstand pressure Tpmax, which corresponds to the saturation temperature of the withstand pressure of a high-pressure pipe, from the withstand pressure of a pipe. Therefore, a preset upper limit value TcmMax of Tcm may be uniquely determined within the range that is restricted by Tdmax and Tpmax, in accordance with the evaporating temperature Te.

As described above, due to the existence of the preset upper limit value TcmMax of Tcm, the target value of the discharge pressure in step S6 in FIG. 4 may be modified taking into account the preset upper limit value TcmMax of Tcm. For example, in the case where the evaporating temperature decreases, even when the condensing temperature Tc is not changed, the discharge temperature increases. Therefore, in the case where the target condensing temperature Tcm is equal to or higher than the preset upper limit value TcmMax of Tcm, Tcm may be set to TcmMax. Thus, by making Tcm variable, an operation of the compressor with ensured reliability may be achieved.

Embodiment 2

Embodiment 2 of the present invention will be described in details hereinafter with reference to figures.

Figure 6:
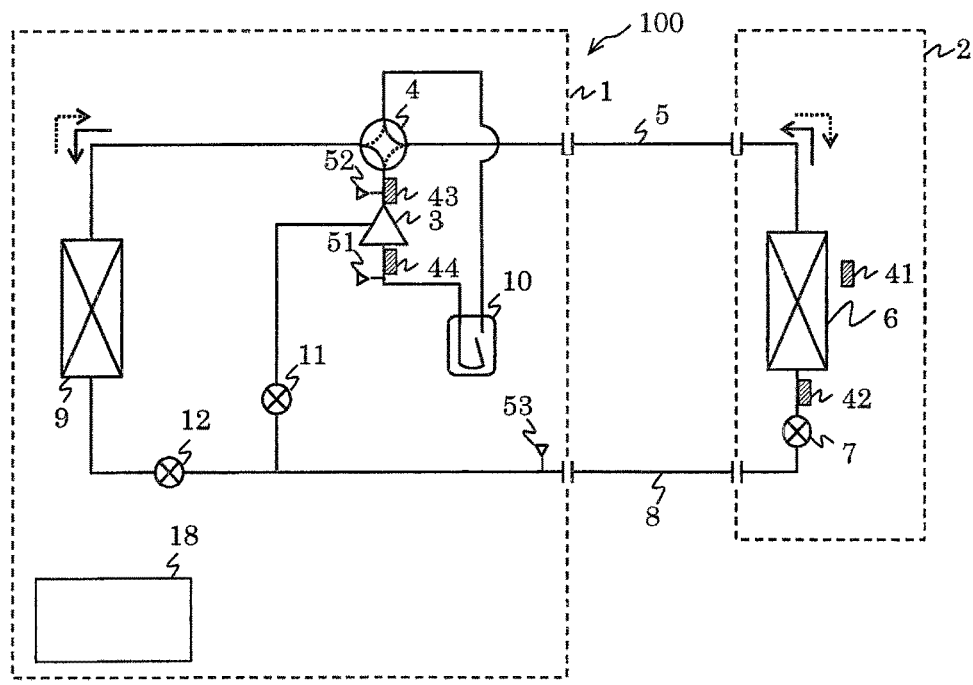
FIG. 6 is a system diagram of an air-conditioning apparatus according to Embodiment 2 of the present invention.

FIG. 6 is a refrigerant circuit diagram of an air-conditioning apparatus 100 according to Embodiment 2 of the present invention. In FIG. 6, regarding the refrigerant circuit, in the outdoor unit 1 of the circuit illustrated in FIG. 1 according to Embodiment 1, a heat-source-side expansion device 12 is provided between the outdoor heat exchanger 9 and the liquid pipe 8, a pressure sensor 53 is provided between the heat-source-side expansion device 12 and the liquid pipe 8, and a bypass that branches off from a refrigerant pipe positioned between the heat-source-side expansion device 12 and the liquid pipe 8 (or the load-side expansion device 7) and that allows bypassing to an intermediate pressure of the compressor 3, and a bypass expansion device 11 that adjusts the bypass flow rate of the bypass, are provided.

The compressor 3 is of a type in which capacity control is performed by controlling the rotation speed with an inverter and has a configuration that is capable of injecting refrigerant supplied from the bypass into a compression chamber inside the compressor 3. That is, the compressor 3 is an injection-type compressor.

Next, a heating operation in the case of an injection operation that is a feature of the air-conditioning apparatus 100 of Embodiment 2 will be described with reference to FIG. 6 and a p-h diagram illustrated in FIG. 7. The heat-source-side expansion device 12 controls the refrigerant pressure (intermediate pressure 1) at the pressure sensor 53 decompressed at the load-side expansion device 7 to be constant (point (e) in FIG. 7). Part of the refrigerant at the intermediate pressure 1 is decompressed at the heat-source-side expansion device 12, turns into a low-temperature two-phase refrigerant, and flows into the outdoor heat exchanger 9 (point (f) in FIG. 7). The rest of the refrigerant passes through the bypass, is decompressed to an intermediate pressure 2 at the bypass expansion device 11, turns into a medium-temperature two-phase refrigerant (point (f) in FIG. 7), and is injected to the compressor 3. Inside the compressor 3, after the sucked refrigerant (point (d) in FIG. 7) is compressed to the intermediate pressure 2 and heated (point (g) in FIG. 7), the refrigerant merges with the injected refrigerant, and after the temperature is reduced (point (h) in FIG. 7), the merged refrigerant is compressed to high-pressure side pressure and discharged (point (a) in FIG. 7).

Effects of injection will now be described. The circuit configuration of the apparatus is a so-called flash injection circuit. That is, the apparatus has a configuration in which a two-phase refrigerant which is flowed out of the indoor heat exchanger 6 serving as a condenser and then decompressed to the intermediate pressure 2 is injected to the compressor 3.

Using a flash injection circuit provides the effects described below. First, by performing flash injection, the flow rate of refrigerant discharged from the compressor 3 increases, and the refrigerant flow rate Gdis discharged from the compressor 3 becomes equal to a value obtained by adding the refrigerant flow rate Gsuc of refrigerant sucked into the compressor 3 to the refrigerant flow rate Ginj of refrigerant injected. Since the refrigerant flow rate of refrigerant flowing into a heat exchanger serving as a condenser increases, in the case of a heating operation, the heating capacity increases. At this time, the discharge temperature is cooled down and decreases by the injected refrigerant.

Furthermore, performing flash injection achieves an effect of improved efficiency. By performing flash injection, some of a gas refrigerant flowing into an evaporator is extracted at the intermediate pressure 2 and injected, so that the pressure increases from the intermediate pressure 2 to high-pressure side pressure and is compressed. Therefore, as for the flow rate of the injected gas refrigerant, the work of compression for increasing the pressure from low pressure to high-pressure side pressure becomes unnecessary, thereby enhancing the efficiency accordingly.

Further, by causing refrigerant to perform bypassing, the circulation amount of refrigerant flowing in the evaporator deceases. Thus, a pressure loss that occurs when refrigerant passes through the evaporator decreases, resulting in an increased suction pressure of compressor suction. Therefore, the efficiency is enhanced. The larger the pressure loss, the higher the improved efficiency. Therefore, as the length of the pipe from the evaporator to the compressor suction increases or as the operation capacity of the compressor increases and the circulation amount of refrigerant increases, the effect is enhanced more.

Next, a control operation of the air-conditioning apparatus 100 will be described. As in Embodiment 1, the air-conditioning apparatus 100 controls the opening degree of the load-side expansion device 7 so that the degree of subcooling SC of refrigerant at the outlet of the indoor heat exchanger 6 becomes equal to the target degree of subcooling SCm, and performs control for changing the operation capacity of the compressor 3 so that the condensing temperature Tc, which corresponds to the high-pressure side pressure Pd of the refrigerant circuit, becomes closer to the target condensing temperature Tcm, which corresponds to a target high pressure.

Further, the opening degree of the heat-source-side expansion device 12 is controlled so that the intermediate pressure 1 of the pressure sensor 53 becomes higher than the intermediate pressure 2 of the injection pressure in order to allow refrigerant to flow to the bypass. In the case where the condensing temperature Tc has not increased to the target condensing temperature Tcm even when the operation capacity of the compressor 3 is at the maximum value through the operation capacity control of the compressor 3, the bypass expansion device 11 is opened and refrigerant is injected to the compressor 3. Therefore, the circulation amount of refrigerant is increased, and the heating capacity is increased.

Figure 7:
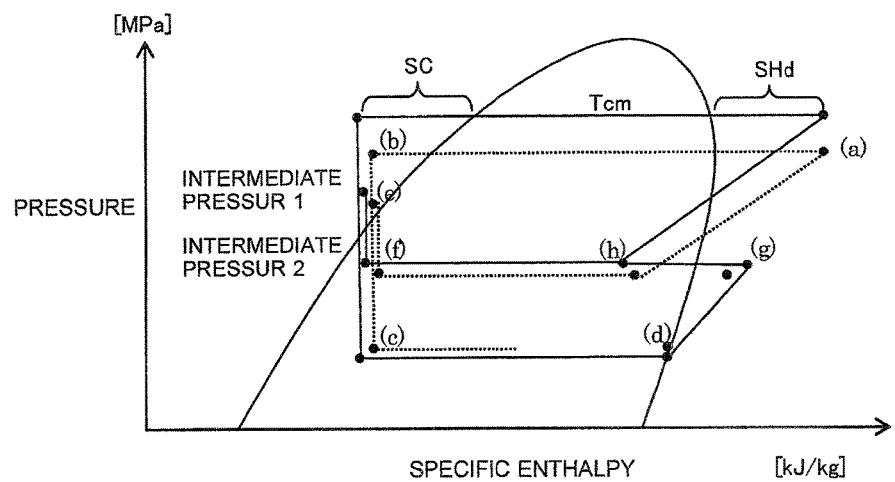
FIG. 7 is a p-h diagram of the air-conditioning apparatus according to Embodiment 2 of the present invention.

However, there is the upper limit of the bypass amount, and in order to prevent liquid compression from occurring at the compressor 3, it is necessary to ensure a predetermined amount or more of the degree of discharge superheat SHd of the compressor 3, as illustrated in FIG. 7. Therefore, in the case where the outside air temperature further drops, low pressure decreases, and the circulation amount of refrigerant decreases, there will be a shortage of the heating capacity relative to the required heating capacity. In such a case, there is a risk of not being able to increase the heating capacity to the required heating capacity. Here, the degree of discharge superheat of the compressor 3 can be calculated by subtracting the condensing temperature Tc from a measurement value of the temperature sensor 43 of the compressor discharge.

Thus, in some cases, heating capacity control may be performed only within the variable range of the operation capacity of the compressor 3, and a required heating capacity may not be obtained merely by performing the operation capacity control of the compressor 3 while performing the degree-of-subcooling control by the load-side expansion device 7 with the target degree of subcooling SCm being preset to a certain value and performing the injection amount control by the bypass expansion device 11.

In order to solve such a problem, in the case where the condensing temperature Tc has not reached the target condensing temperature Tcm when the compressor 3 is performing an operation with the maximum operation capacity during the degree-of-subcooling control by the load-side expansion device 7 and the injection amount control by the bypass expansion device 11, the air-conditioning apparatus 100 reduces the opening degree of the load-side expansion device 7 to increase the heating capacity, and performs control for increasing the condensing temperature Tc, based on the value of the pressure sensor 52.

In FIG. 7, the solid line on the p-h diagram represents how the saturation temperature Tc converted from a high-pressure side pressure by the pressure sensor 52 becomes equal to the target condensing temperature Tcm by expansion at the load-side expansion device 7. Assuming that the normal state is illustrated as the cycle by the broken line, the diagram indicates an increased high-pressure side pressure and an increased discharge temperature cause the degree of discharge superheat SHd of the compressor to increase and thus also cause the injection amount to increase. Therefore, the circulation amount of refrigerant increases and high-pressure side pressure also increases, thereby increasing the heating capacity.

Figure 8:
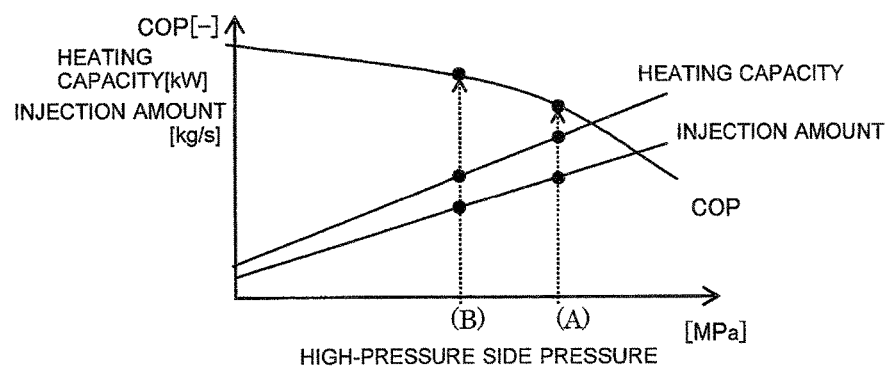
FIG. 8 is a diagram illustrating the relation between COP and heating capacity with respect to high-pressure side pressure in Embodiment 2 of the present invention.

FIG. 8 illustrates the relation among the COP, heating capacity, and injection amount of the air-conditioning apparatus 100 with respect to high-pressure side pressure. At the time of a heating operation, the load-side expansion device 7 performs control so that the degree of subcooling at the outlet of the indoor heat exchanger 6 is made constant, and the bypass expansion device 11 controls the injection amount so that the degree of superheat SHd at the outlet of the compressor 3 becomes equal to a predetermined value, and the compressor 3 controls the operation capacity so that the high-pressure side pressure becomes equal to a saturation pressure corresponding to the target condensing temperature Tcm, and maintains the pressure of (A) in FIG. 8. When the outside air temperature drops, due to a reduced evaporating pressure caused by the drop in the outside air temperature, the density of refrigerant sucked in the compressor 3 decreases. Therefore, the circulation amount of refrigerant decreases accordingly. This makes it impossible to increase the circulation amount of refrigerant when the air-conditioning apparatus is operating at the maximum operation capacity, and causes the heating capacity to decrease. High pressure in FIG. 8 decreases from (A) to (B), and the heating capacity decreases.

Therefore, the control target of the load-side expansion device 7 is shifted from the degree of subcooling at the outlet of the indoor heat exchanger 6 to the target condensing temperature Tcm of high-pressure side pressure. By reducing the current opening degree of the load-side expansion device 7 of (B) in FIG. 8, the high-pressure side pressure and the injection amount are increased and can be controlled to a pressure corresponding to the desired target condensing temperature Tcm ((A) in FIG. 8), thus achieving a desired heating capacity. At this time, the high-pressure side pressure increases, and the COP decreases accordingly. However, since the heating capacity corresponding to an air-conditioning load is maintained, indoor comfort is enhanced. Thus, by controlling high-pressure side pressure to the desired pressure with the load-side expansion device 7 when the compressor 3 is operating at the maximum operation capacity, the air-conditioning apparatus 100 becomes capable of exhibiting the maximum heating capacity.

Owing to the control target of the load-side expansion device 7 being high-pressure side pressure, the air-conditioning apparatus 100 can be controlled to operate at the minimum level, even in the case where there is a slight shortage in the amount of charged refrigerant in the air-conditioning apparatus 100 (for example, in the case where there is a leakage of refrigerant due to aged deterioration caused by pipe junction defect or refrigerant is charged deficiently relative to a specified refrigerant amount at the initial installment) and the degree of subcooling at the outlet of the indoor heat exchanger 6 cannot be ensured.

Next, control of the compressor 3, the heat-source-side expansion device 12, the bypass expansion device 11, and the load-side expansion device 7 at the time of a heating operation of the air-conditioning apparatus 100 will be described with reference to the flowchart in FIG. 9. First, at the start of the air-conditioning apparatus 100, an initial capacity of the compressor 3, an initial opening degree of the load-side expansion device 7, and initial opening degrees of the heat-source-side expansion device 12 and the bypass expansion device 11 are set (S1). Next, after waiting until a predetermined time passes (S2), it is determined whether the indoor air temperature detected by the temperature sensor 41 is equal to a value preset by a user (S3). When the indoor air temperature is lower than the preset value, the operation capacity of the compressor 3 is increased, and when the indoor air temperature is higher than the preset value, the operation capacity of the compressor 3 is reduced (S4). Then, it is determined whether the current status of the operation capacity of the compressor is at the maximum capacity (S5). When the compressor 3 is operating at the maximum operation capacity, it is determined whether the discharge pressure of the pressure sensor 52 has reached a pressure corresponding to a target condensing temperature (S6). When the discharge pressure has not reached the pressure corresponding to the target condensing temperature, since there is a shortage of the heating capacity, the opening degree of the load-side expansion device 7 is changed so that the discharge pressure becomes equal to the pressure corresponding to the target condensing temperature (S7). When the compressor is operating at a discharge pressure equal to or higher than the desired target value, since a desired heating capacity is achieved, the opening degree of the load-side expansion device 7 is changed so that the degree of subcooling at the outlet of the indoor heat exchanger 6 becomes equal to a preset value (S8). Next, it is determined whether the intermediate pressure 1 detected by the pressure sensor 53 is equal to a preset value (S9). When the intermediate pressure 1 is lower than the preset value, the opening degree of the heat-source-side expansion device 12 is reduced, and when the intermediate pressure 1 is higher than the preset value, the opening degree of the heat-source-side expansion device 12 is increased (S10). Then, it is determined whether the degree of discharge superheat SHd of the compressor 3 is equal to a preset value (S11). When the degree of discharge superheat SHd is lower than the preset value, the opening degree of the bypass expansion device 11 is reduced, and when the degree of discharge superheat SHd is higher than the preset value, the opening degree of the bypass expansion device 11 is increased (S12).

The above control makes it easier, for the air-conditioning apparatus 100, to increase, even in the case where the heating capacity cannot be increased to a required heating capacity (that is, target condensing temperature Tcm) merely by performing the operation capacity control of the compressor 3, the heating capacity to the required heating capacity, and the controllable range towards a larger heating capacity may thus be expanded since the injection amount increases by increasing the discharge temperature through an increase in high-pressure side pressure.

As in Embodiment 1, the target condensing temperature Tcm of discharge pressure may be made variable. However, in Embodiment 2, since the discharge temperature is controllable, by performing injection, at or below the upper limit Tdmax (for example, 120 degrees Centigrade) of the compressor discharge temperature, a preset upper limit value TcmMax of Tcm may be uniquely determined as Tpmax, which is obtainable by a saturation conversion of the withstand pressure of the pipe.

Figure 9:
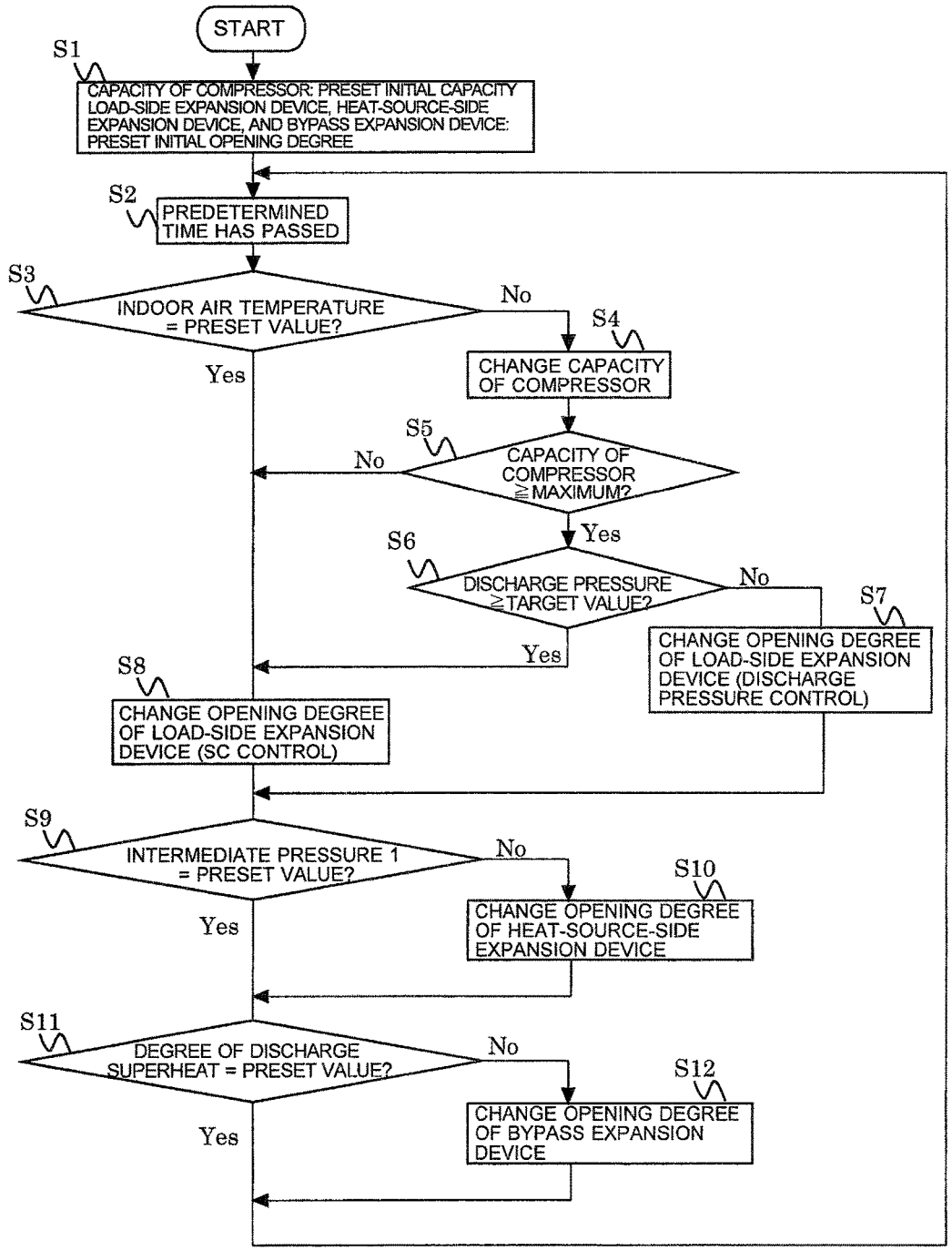
FIG. 9 is a control flowchart at the time of a heating operation of the air-conditioning apparatus according to Embodiment 2 of the present invention.

As described above, due to the existence of the preset upper limit value TcmMax of Tcm, the target value of the discharge pressure in step S6 in FIG. 9 may be modified taking into account the preset upper limit value TcmMax of Tcm. For example, in the case where the condensing temperature is low at the start, increasing Tcm to the preset upper limit value TcmMax causes an effect of increasing a control gain. Therefore, the heating capacity can be started at an earlier stage, and the indoor temperature is able to be increased to a desired temperature in a shorter time.

Further, as a method for increasing high-pressure side pressure at the discharge of the compressor 3, the air volume of air blown by a fan into the indoor heat exchanger 6 may be reduced. As described above, by performing an operation, the condensing temperature increases, and the discharge temperature also increases. Therefore, the injection amount increases, and the heating capacity thus increases. Furthermore, control of the air volume of air blown by the fan and control of the opening degree of the load-side expansion device 7 may be combined together.

Embodiment 3

Embodiment 3 of the present invention will be described in details hereinafter with reference to figures.

Figure 10:
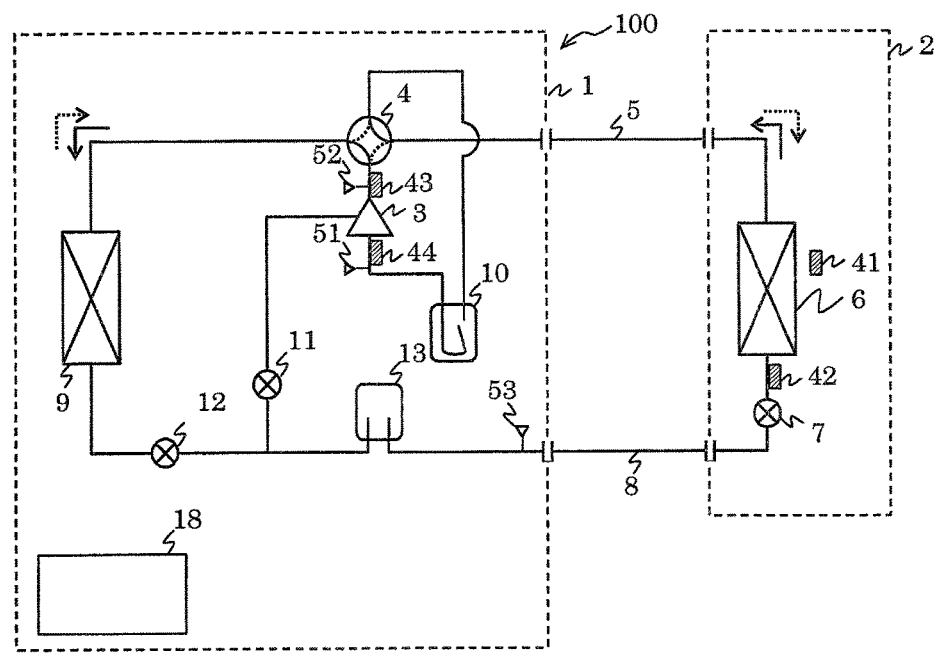
FIG. 10 is a system diagram of an air-conditioning apparatus according to Embodiment 3 of the present invention.

FIG. 10 is a refrigerant circuit diagram of the air-conditioning apparatus 100 according to Embodiment 3 of the present invention. In FIG. 10, regarding the refrigerant circuit, in the circuit illustrated in FIG. 6 according to Embodiment 2, a receiver 13 is provided between the heat-source-side expansion device 12 and the pressure sensor 53 in the outdoor unit 1.

Next, a heating operation of the computing apparatus 100 according to Embodiment 3 will be explained with reference to p-h diagrams illustrated in FIGS. 10 and 11. This control operation differs from Embodiment 2 only in the method for controlling the heat-source-side expansion device 12, and control is performed such that the degree of outlet superheat SHs of the outdoor heat exchanger 9 is made constant (point (d) in FIG. 11). Here, the degree of outlet superheat SHs of the outdoor heat exchanger 9 may be calculated by subtracting the saturation temperature detected by the pressure sensor 51 from a measurement value of the temperature sensor 44 on the suction side of the compressor 3.

Effects of a receiver circuit will now be explained. The circuit configuration of the apparatus is a so-called intermediate-pressure receiver circuit. Using the receiver circuit provides the effects described below. First, excess refrigerant at the time of a heating operation generated by a difference in the necessary refrigerant amount between a cooling operation and a heating operation can be stored in an intermediate-pressure receiver. Thus, since the amount of refrigerant stored in the accumulator 10 at the time of starting the compressor is small, the work of compression for sending refrigerant to the condenser may be reduced. Therefore, a high-efficiency operation may be performed at the time of start. Furthermore, since the initial state of distribution of refrigerant is close to a stationary state, the time during which the refrigeration cycle is in the stationary state is short, thereby exhibiting a desired heating capacity in a shorter time.

Next, a control operation of the air-conditioning apparatus 100 will be explained. As in Embodiment 2, the air-conditioning apparatus 100 controls the opening degree of the load-side expansion device 7 so that the degree of subcooling SC of refrigerant at the outlet of the indoor heat exchanger 6 becomes equal to the target degree of subcooling SCm, and performs control for changing the operation capacity of the compressor 3 so that the condensing temperature Tc, which corresponds to the high-pressure side pressure Pd of the refrigerant circuit, becomes closer to the target condensing temperature Tcm, which corresponds to a target high-pressure side pressure.

Further, the opening degree of the heat-source-side expansion device 12 is controlled so that the degree of outlet superheat of the outdoor heat exchanger 9 becomes equal to a desired value. In the case where the condensing temperature Tc has not increased to the target condensing temperature Tcm even when the operation capacity of the compressor 3 is at the maximum value through the operation capacity control of the compressor 3, the bypass expansion device 11 is opened and refrigerant is injected to the compressor 3. Therefore, the circulation amount of refrigerant is increased, and the heating capacity is increased.

Figure 11:
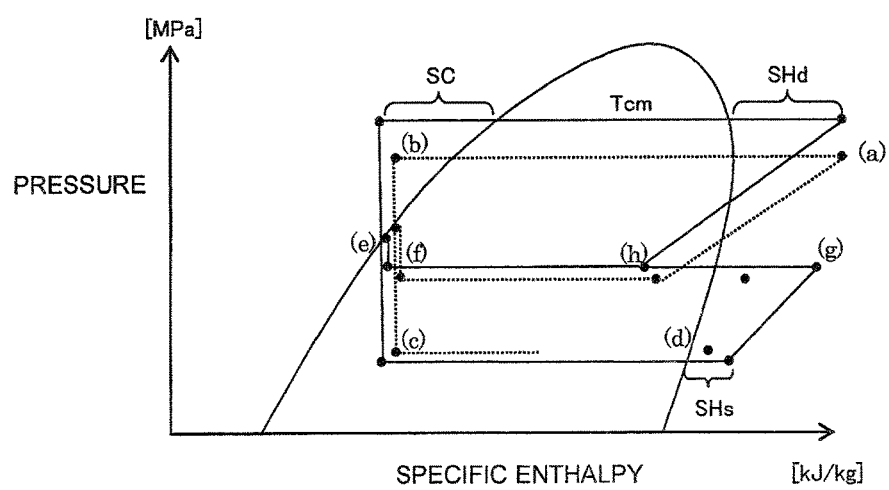
FIG. 11 is a p-h diagram of the air-conditioning apparatus according to Embodiment 3 of the present invention.

However, as in Embodiment 2, there is the upper limit of the bypass amount, and in order to prevent liquid compression from occurring at the compressor 3, it is necessary to ensure a predetermined amount or more of the degree of superheat SHd at the discharge of the compressor 3, as illustrated in FIG. 11. Therefore, in the case where the outside air temperature further drops, low pressure decreases, and the circulation amount of refrigerant decreases, there will be a shortage of the heating capacity relative to the required heating capacity. In such a case, there is a risk of not being able to increase the heating capacity to the required heating capacity.

Thus, in some cases, heating capacity control may be performed only within the variable range of the operation capacity of the compressor 3, and a required heating capacity may not be obtained merely by performing the operation capacity control of the compressor 3 while performing the degree-of-subcooling control by the load-side expansion device 7 with the target degree of subcooling SCm being preset to a certain value and performing the injection amount control by the bypass expansion device 11.

In order to solve such a problem, in the case where the condensing temperature Tc has not reached the target condensing temperature Tcm when the compressor 3 is performing an operation with the maximum operation capacity during the degree-of-subcooling control by the load-side expansion device 7 and the injection amount control, the air-conditioning apparatus 100 reduces the opening degree of the load-side expansion device 7 to increase the heating capacity, performs control for increasing the condensing temperature Tc, based on the value of the pressure sensor 52, reduces the heat-source-side expansion device 12, and performs control for increasing the degree of suction superheat SHs becomes higher than a usual operation time.

In FIG. 11, the solid line on the p-h diagram represents how the saturation temperature Tc converted from a high-pressure side pressure by the pressure sensor 52 becomes equal to the target condensing temperature Tcm by expansion at the load-side expansion device 7. Assuming that the normal state is illustrated as the cycle by the broken line, the diagram indicates an increased high-pressure side pressure by expansion at the second refrigerant pipe 7 and an increased discharge temperature by expansion at the heat-source-side expansion device 12 cause the degree of discharge superheat SHd of the compressor to increase and thus also cause the injection amount to increase. Therefore, the circulation amount of refrigerant increases and high-pressure side pressure also increases, thereby increasing the heating capacity.

Figure 12:
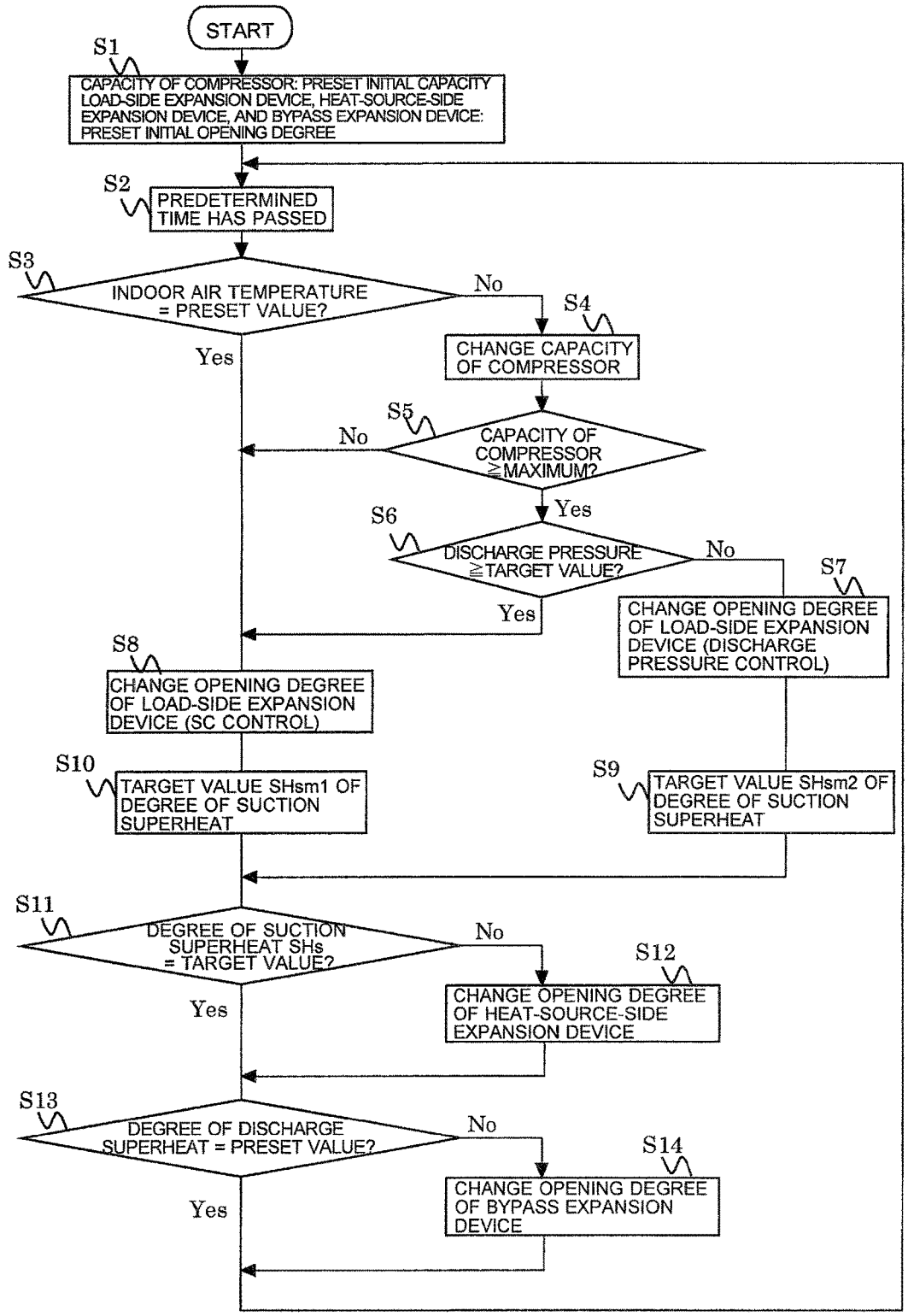
FIG. 12 is a control flowchart at the time of a heating operation of the air-conditioning apparatus according to Embodiment 3 of the present invention.

Next, control of the compressor 3, the heat-source-side expansion device 12, the bypass expansion device 11, and the load-side expansion device 7 at the time of a heating operation of the air-conditioning apparatus 100 will be described with reference to the flowchart in FIG. 12. First, at the start of the air-conditioning apparatus 100, an initial capacity of the compressor 3, an initial opening degree of the load-side expansion device 7, and initial opening degrees of the heat-source-side expansion device 12 and the bypass expansion device 11 are set (S1). Next, after waiting until a predetermined time passes (S2), it is determined whether the indoor air temperature detected by the temperature sensor 41 is equal to a value preset by a user (S3). When the indoor air temperature is lower than the preset value, the operation capacity of the compressor 3 is increased, and when the indoor air temperature is higher than the preset value, the operation capacity of the compressor 3 is reduced (S4). Then, it is determined whether the current status of the operation capacity of the compressor is at the maximum capacity (S5). When the compressor 3 is operating at the maximum operation capacity, it is determined whether the discharge pressure of the pressure sensor 52 has reached a pressure corresponding to a target condensing temperature (S6). When the discharge pressure has not reached the pressure corresponding to the target condensing temperature, since there is a shortage of the heating capacity, the opening degree of the load-side expansion device 7 is changed so that the discharge pressure becomes equal to the pressure corresponding to the target condensing temperature (S7). When the compressor is operating at a discharge pressure equal to or higher than the desired target value, since a desired heating capacity is achieved, the opening degree of the load-side expansion device 7 is changed so that the degree of subcooling at the outlet of the indoor heat exchanger 6 becomes equal to a preset value (S8). When the discharge pressure has reached the target value, a target value SHsm1 of the degree of suction superheat of the degree of output superheat SHs of the outdoor heat exchanger 9 is set (S10). When the discharge pressure is equal to or lower than the target value, a target value SHsm2 of the degree of suction superheat of the degree of outlet superheat SHs of the outdoor heat exchanger 9 is set. Here, the target values satisfy the relation SHsm1<SHsm2 (S9). Next, it is determined whether the degree of suction superheat SHs is equal the target value (S11). When the degree pf suction superheat SHs is lower than the target value, the opening degree of the heat-source-side expansion device 12 is reduced, and when the degree of suction superheat SHs is higher than the target value, the opening degree of the heat-source-side expansion device 12 is increased (S12). Then, it is determined whether the degree of discharge superheat of the compressor 3 is equal to a preset value (S13). When the degree of discharge superheat SHd is lower than the preset value, the degree of the bypass expansion device 11 is reduced, and when the degree of discharge superheat SHd is higher than the preset value, the degree of the bypass expansion device 11 is increased (S14).

The above control makes it easier, for the air-conditioning apparatus 100, to increase, even in the case where the heating capacity cannot be increased to a required heating capacity (that is, target condensing temperature Tcm) merely by performing the operation capacity control of the compressor 3, the heating capacity to the required heating capacity, and the controllable range towards a larger heating capacity may thus be expanded since the injection amount increases by increasing the degree of suction superheat.

As in Embodiment 2, obviously, the target condensing temperature Tcm of the discharge pressure may be made variable.

In addition, although a configuration in which the accumulator 10 is provided has been explained in each of Embodiment 1 to Embodiment 3, the accumulator may not be provided.

REFERENCE SIGNS LIST

1: outdoor unit (heat-source-side unit), 2: indoor unit (load-side unit), 3: compressor, 4: four-way valve, 5: gas pipe, 6: indoor heat exchanger (load-side heat exchanger), 7: load-side expansion device, 8: liquid pipe, 9: outdoor heat exchanger (heat-source-side heat exchanger), 10: accumulator, 11: bypass expansion device, 12: heat-source-side expansion device, 13: receiver, 18: measurement control device, 41: temperature sensor, 42: temperature sensor, 43: temperature sensor, 44: temperature sensor, 51: pressure sensor, 52: pressure sensor, 53: pressure sensor, 100: air-conditioning apparatus

The invention claimed is:

1. An air-conditioning apparatus comprising:
a refrigeration cycle configured by connecting a load-side heat exchanger, a load-side expansion device, a heat-source-side heat exchanger, a heat-source-side expansion device provided between the load-side expansion device and the heat-source-side heat exchanger, and a compressor and by causing refrigerant to circulate through a refrigerant circuit including the load-side heat exchanger, the load-side expansion device, the heat-source-side expansion device, the heat-source-side heat exchanger, and the compressor, the compressor is a compressor that is capable of injecting refrigerant;
a controller configured to control an opening degree of the load-side expansion device and an operation capacity of the compressor;
a bypass pipe that extends from a portion of a flow passage between the load-side expansion device and the heat-source-side expansion device to an injection port of the compressor; and
a bypass expansion device that adjusts a flow rate of the bypass pipe, wherein
the refrigeration cycle is configured such that the refrigerant
flows during a heating operation through the compressor, the load-side heat exchanger, and the load-side expansion device in this order,
branches into a flow passage in which the refrigerant is decompressed by the heat-source-side expansion device, flows into the heat-source-side heat exchanger, and is sucked in the compressor, and
branches into the bypass pipe in which the refrigerant is decompressed by the bypass expansion device and injected to the compressor,
the controller is configured to, during the heating operation,
control the operation capacity of the compressor so that pressure of the refrigerant at an outlet of the compressor becomes equal to a target pressure,
control an opening degree of the load-side expansion device so that a degree of subcooling of the refrigerant at an outlet of the load-side heat exchanger becomes equal to a target degree of subcooling in response to a case where an operation capacity of the compressor is approximately at a maximum value of the operation capacity of the compressor and a condensing temperature of the load-side heat exchanger is equal to or larger than a target temperature, and
reduce an opening degree of the load-side expansion device, based on a discharge pressure of the compressor, so that the pressure of the refrigerant at the outlet of the compressor becomes equal to the target pressure in response to a case where the operation capacity of the compressor is approximately at the maximum value of the operation capacity of the compressor and the condensing temperature of the load-side heat exchanger is lower than the target temperature.

2. The air-conditioning apparatus of claim 1, further comprising:
a receiver that is provided between the load-side expansion device and the heat-source-side expansion device and that stores refrigerant,
wherein after controlling or reducing the opening degree of the load-side expansion device, in a case where a degree of suction refrigerant superheat of the compressor is lower than a target value, the controller reduces an opening degree of the heat-source-side expansion device so that the degree of suction refrigerant superheat increases.

3. The air-conditioning apparatus of claim 1,
wherein during the heating operation, in a case where the operation capacity of the compressor is approximately at the maximum value of the operation capacity of the compressor and the discharge pressure of the compressor is smaller than a target value, the controller performs control for reducing an air volume of air blown to the load-side heat exchanger, instead of the control for the opening degree of the load-side expansion device or along with the control for the opening degree of the load-side expansion device, to achieve the target pressure.

4. The air-conditioning apparatus of claim 1,
wherein an upper limit value of the target pressure is determined based on an upper limit restriction temperature of a discharge temperature of the compressor or withstanding pressures of pipes of the refrigerant circuit.

5. The air-conditioning apparatus of claim 1, further comprising:
an accumulator that is provided on a suction side of the compressor and that stores the refrigerant.

6. The air-conditioning apparatus of claim 1, wherein the controller is configured to determine whether the compressor is at a maximum capacity of the compressor.

7. The air-conditioning apparatus of claim 1, wherein
the controller is configured to control an opening degree of the heat-source-side expansion device so that a discharge pressure of the load-side expansion device is to be constant after controlling or reducing the opening degree of the load-side expansion device.

8. The air-conditioning apparatus of claim 7, wherein
the controller is configured to
reduce the opening degree of the heat-source-side expansion device in a case where the discharge pressure of the load-side expansion device is lower than a preset value, and increase the opening degree of the heat-source-side expansion device in a case where the discharge pressure of the load-side expansion device is higher than the preset value.

\* \* \* \* \*